US006740187B2

(12) United States Patent
Schweikart

(10) Patent No.: US 6,740,187 B2
(45) Date of Patent: May 25, 2004

(54) METHOD OF PRODUCING A WINDOW SECTION

(75) Inventor: Bernd Schweikart, Sulz-Bergfelden (DE)

(73) Assignee: Martin Walter Hoffman, Bruchsal (DE)

( * ) Notice: Subject to any disclaimer, the term of this patent is extended or adjusted under 35 U.S.C. 154(b) by 0 days.

(21) Appl. No.: 09/829,717

(22) Filed: Apr. 10, 2001

(65) Prior Publication Data

US 2001/0034985 A1 Nov. 1, 2001

(30) Foreign Application Priority Data

Apr. 11, 2000 (DE) ........................................ 100 17 945

(51) Int. Cl.[7] .......................... B32B 31/18; E06B 1/64; E06B 3/54; E06B 3/96

(52) U.S. Cl. ....................... 156/250; 156/258; 156/266; 49/504; 49/506; 52/204.5; 52/204.61; 52/204.7

(58) Field of Search ................................ 156/250, 252, 156/253, 258, 260, 266, 257; 49/506, 504, 339; 40/780, 782, 785, 788; 52/204.5, 204.61, 204.7

(56) References Cited

U.S. PATENT DOCUMENTS

| | | | | | |
|---|---|---|---|---|---|
| 2,521,603 | A | * | 9/1950 | Prew | 40/152 |
| 3,802,105 | A | * | 4/1974 | Bendix | 40/152 |
| 3,994,087 | A | * | 11/1976 | Koeppen | 40/152 |
| 4,064,644 | A | * | 12/1977 | Warner et al. | 40/152 |
| 4,503,640 | A | * | 3/1985 | Stern | 49/425 |
| 4,509,294 | A | * | 4/1985 | Boilard | 49/504 |
| 4,740,397 | A | * | 4/1988 | Santo | 428/12 |
| 5,361,476 | A | * | 11/1994 | Leopold | 29/417 |

FOREIGN PATENT DOCUMENTS

| | | | | |
|---|---|---|---|---|
| DE | 19637318 | * | 1/1997 | E05C/9/00 |
| EP | 484235 | * | 5/1992 | E06B/3/30 |

* cited by examiner

*Primary Examiner*—J. A. Lorengo
(74) *Attorney, Agent, or Firm*—Bachman & LaPointe, P.C.

(57) ABSTRACT

In a method for producing a window section (1), especially a sash section (2) or frame section (3), for timber/aluminum windows, for timber/plastic windows and for wooden windows, the window section (1) is to be profiled as an elongate timber section with glass rebate, gear channels, grooves, etc.

10 Claims, 3 Drawing Sheets

METHOD OF PRODUCING A WINDOW SECTION

BACKGROUND OF THE INVENTION

The present invention relates to a method of producing a window section, especially a sash section or frame section for timber/aluminum, timber/plastic or wooden windows.

In conventional measures for producing a window section, in particular a sash section or a frame section, each leg of a window section is cut to length from a timber section and subsequently profiled for, in particular, the insertion of the glass, the seals and the corresponding window gear.

After the insertion of the individual cut-to-length sections, the latter are joined together and, for example, subsequently varnished.

In this case, each individual part, especially each individual section, is profiled separately and then joined to the other parts or sections to form the complete sash section or sash frame.

It is disadvantageous that such working steps are very laborious and cost-intensive. This has proven particularly disadvantageous in the case of timber/aluminum windows, where an aluminum coating or cladding is expensively applied, for example, externally on the timber frame. Internally, and especially on the visible surfaces of the sash or frame sections, the latter have to be varnished accordingly or provided with a coating.

As a result, a very high production cost is incurred in the conventional production of timber/aluminum windows and timber/plastic windows in order to manufacture the latter.

SUMMARY OF THE INVENTION

It is an object of the present invention to provide a method whereby, in a very simple and cost-effective manner, in particular the manufacture and production of such window sections, in particular for timber/aluminum windows, is facilitated, the intention being in particular to reduce the production costs. Moreover, the intention is to guarantee a high standard of manufacture with very high precision and greater stability.

This object is achieved in that the window section is profiled as an elongate timber section with glass rebate, gear channels, grooves, etc.

In the present invention, window sections are preferably profiled as sash or frame sections made from one-piece timber elements or timber sections in, for example, a length of up to approximately 6 meters. In other words, the individual grooves, gear channels, glass rebates, radii and the like are milled in over the entire length.

The elongate window section, especially sash or frame section, is subsequently provided with a coating or sheathing, especially in the visible surfaces. In such cases, a wood veneer can be used as the coating or sheathing and adhesively bonded to the window section.

The coating or sheathing in this case is adhesively bonded over the entire length of the window section, which may for example be 6 meters long. The coating or sheathing projects into the corresponding gear channels and/or glass rebates and completely sheathes the window section in the visible surfaces.

Plastic films, plastic laminates, metallic coatings, metal foils and the like may also be used as coating or sheathing. As a result, an individual design of an inner visible surface of the window section can be produced on a customized basis.

If the coating is also to be in the form of wood veneer, the complete section may optionally be varnished over its entire length.

Subsequently, should it be necessary, the visible surface may be provided with a protective layer, especially a protective film, in order to protect the visible surfaces from damage.

The window section of elongate form, especially sash section or frame section, is then cut to the desired length, and bevel-sawn in order to assemble the individual sections to form the window. When this is done, corresponding connecting elements are inserted into the end surfaces in grooves, dowel pins, dowel holes or the like and the window sections are connected together by the end surfaces.

The dovetail connection of the end surfaces is thus accurate and solid and is additionally centered by means of dowel pins if appropriate, so that after adhesive bonding it is possible to dispense with any additional processing of the visible surface, especially of the coating. The window is completely assembled from the individual sections and is merely additionally fitted with the corresponding fittings and seals and with the glass.

As a result, in particular, a production method is provided which creates an individual visible surface, a connection being created between two end-surface window sections, especially sash or frame sections that have been cut to length and bevel-sawn, guaranteeing high and accurately-fitting stability, the latter requiring precision assembly. In addition, subsequent varnishing of the window or window section after installation is unnecessary. As a result, substantial time savings are guaranteed.

BRIEF DESCRIPTION OF THE DRAWINGS

Further advantages, features and details of the invention are apparent from the description of preferred examples of embodiment which follows and with reference to the drawing, in which.

DETAILED DESCRIPTION

Figure 1:
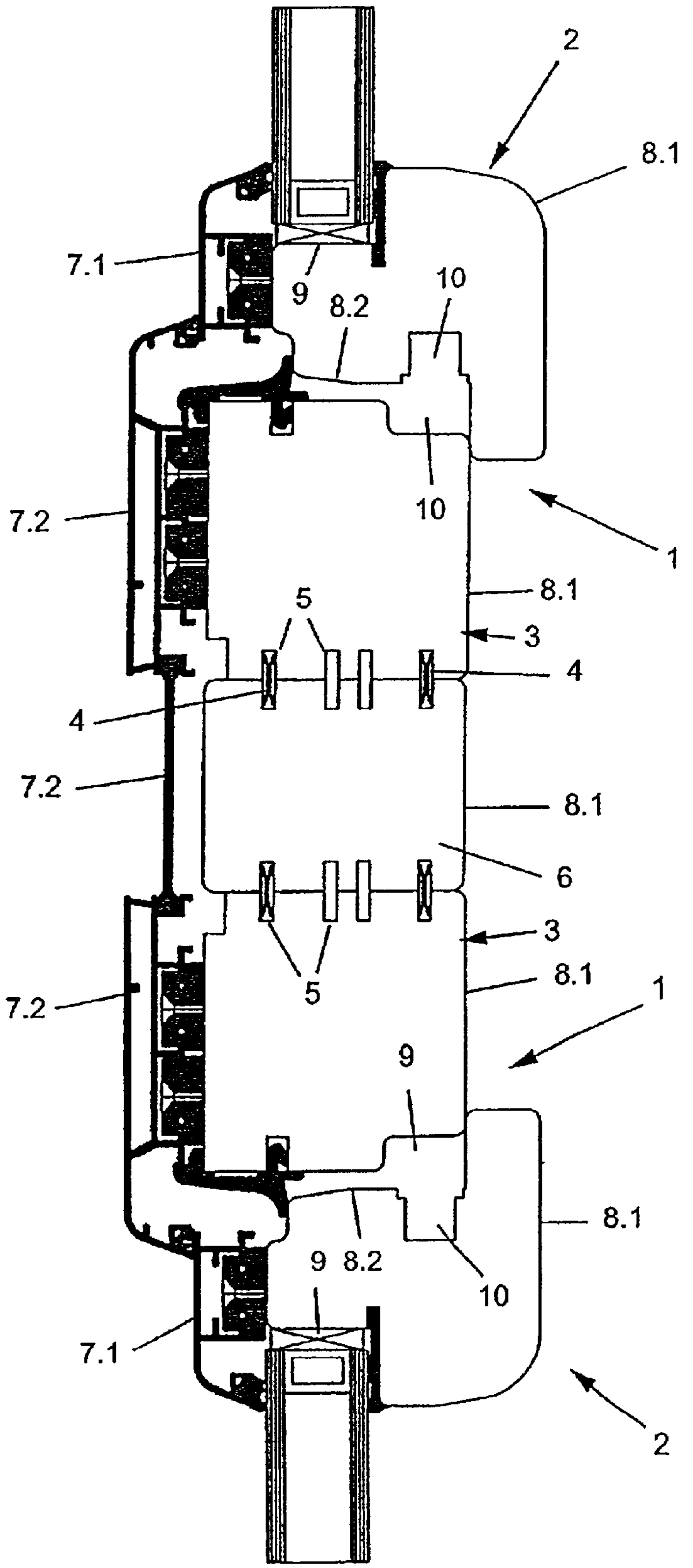
FIG. 1 shows diagrammatically a section through a window section consisting of a plurality of sash and frame sections with a widening section lying between them.

According to FIG. 1, window sections 1 substantially consist of a sash section 2 and a frame section 3 appropriately fitting the latter. If appropriate, connecting elements 4 which engage into corresponding grooves 5 can form a connection to, for example, a widening element 6 on frame sections 3 via corresponding X-shaped cheeks. Instead of the widening element 6, corresponding fittings such as roller blind boxes, frame elements or the like can also form the corresponding connection or seating of the frame.

Substantially, in the case of timber/aluminum windows, an outer side of the sash section 2 and an outer side of the frame section 3 are provided with an aluminum cladding 7.1, 7.2.

In this arrangement, these regions in particular of the sash section 2 and frame section 3 are masked from outside by means of the aluminum cladding 7.1, 7.2. Remaining visible surfaces 8.1, 8.2 are left exposed. The visible surface 8.1 of the sash section 2 possesses a glass rebate 9 and at least one gear channel 10 for fittings.

It has proven particularly advantageous, in the case of the present invention, to produce the window section 1, especially sash section 2 and frame section 3, which are produced from timber, for example in 6-meter sections. The grooves 5, glass rebate 9 and gear channel 10, and the corresponding radii and rebates (not shown in detail here), are milled into the one-piece material, especially into the timber section, over the entire length by means of, for example, profiling machinery.

Figure 2:
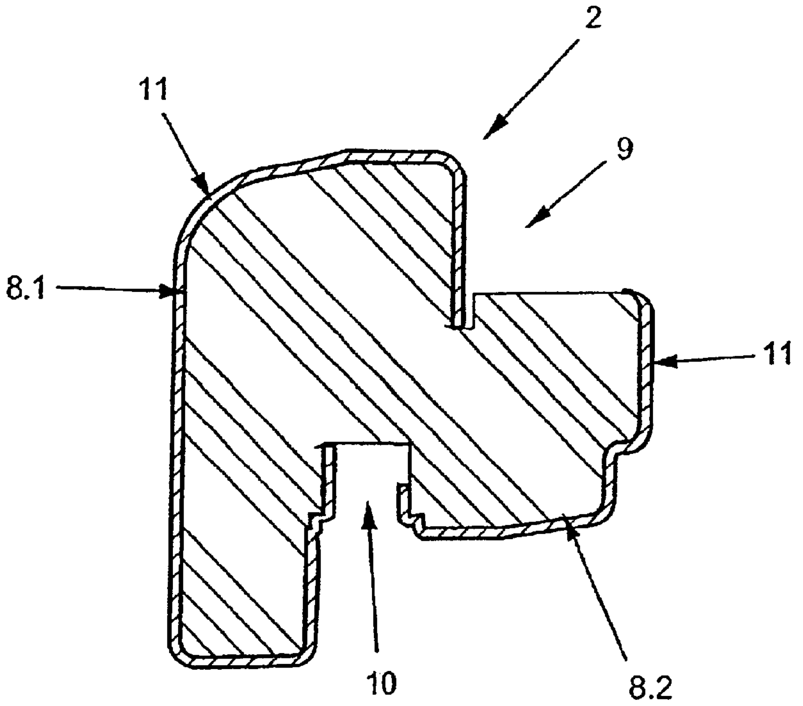
FIG. 2 shows diagrammatically a cross section through a sash section of a window section.
Figure 3:
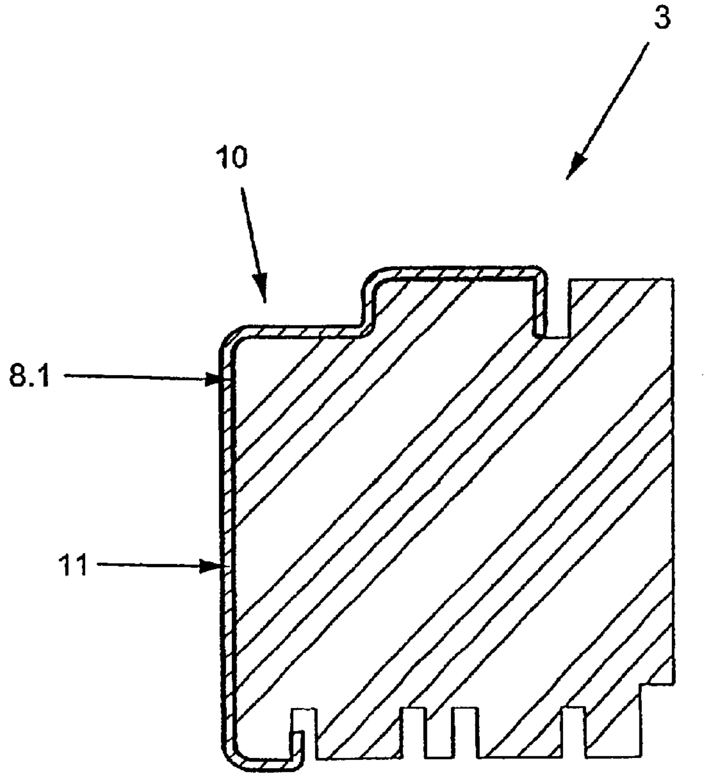
FIG. 3 shows a cross section through a frame section of a window section.

After the production of the corresponding profilings, such as glass rebate 9, gear channel 10 and grooves 5, and corresponding radii, the surface is fine-ground if appropriate and then, as is shown especially in FIGS. 2 and 3, provided with a coating 11 or sheathing. When this is done, the coating 11, especially sheathing, is connected to the sash section 2, especially frame section 3, in the region of the visible surfaces 8.1, 8.2. The coating 11 or sheathing is preferably wood veneer but may also be plastic film, metal foil, plastic or the like.

Preferably, the visible surfaces 8.1, 8.2 are provided with the coating 11, especially sheathing. The coating 11 here projects into corresponding grooves 5 of the glass rebate 9 or into the gear channel 10 and completely sheathes the sash section 2 or frame section 3 in the region of the visible surfaces 8.1, 8.2.

The coating 11 is here applied over the entire length of the section of elongate form, which has been correspondingly pre-profiled. Preferably, the coating 11 is attached by adhesive bonding, and especially firmly glued to the sash section 2 or frame section 3. The latter are preferably made from timber.

If, for example, the coating 11 or sheathing is a veneer, the elongate section provided with the coating 11 is subsequently varnished or correspondingly surface-treated.

Only after the complete coating of the window section 1 over the entire length of the section, preferably 6 meters, are the individual section lengths for the corresponding windows sawn off or bevel-cut from the window section 1, especially from the sash sections 2 or frame sections 3.

Subsequently, the beveled and cut-to-length individual window sections 1 are provided at their end surfaces with corresponding connecting elements 12, preferably by means of dovetail connections, the dovetail connecting elements engaging into grooves of corresponding shape.

Moreover, dowel pins 13 in the end surfaces may engage into one another in order to bring about precise centering of the end-surface connection of the window sections.

It is also advantageous in the case of the present invention that, as a result of the production of a very long section, the subsequent production of the corresponding profiling and the subsequent application of a coating, the desired lengths of sash and frame sections 2, 3 can be produced for the production of a window simply by cutting to length. The latter have only to be connected to one another by the end surfaces, subsequent varnishing or subsequent coating of the window produced from the sash sections 2 and/or frame sections 3 being unnecessary.

As a result of the fact that the corresponding grooves for the connecting elements 12 are merely milled into the end surfaces up to a point close to the visible surfaces 8.1, 8.2, the corresponding connecting elements 12 are not visible from outside.

Figure 4:
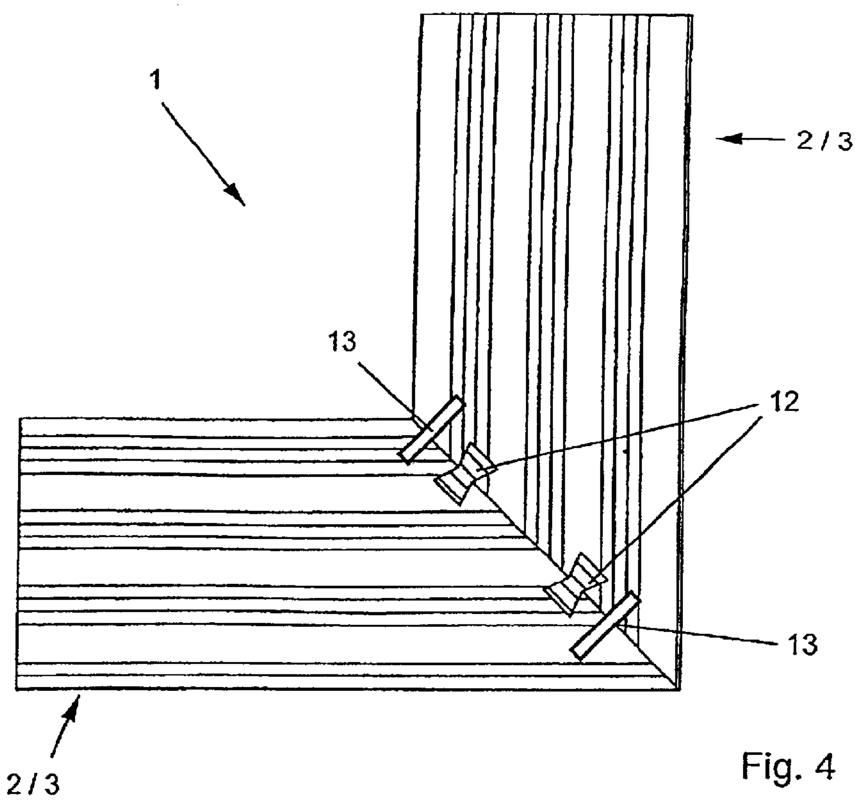
FIG. 4 shows diagrammatically a lengthwise section through a connection of two window sections with connecting elements.
Figure 5:
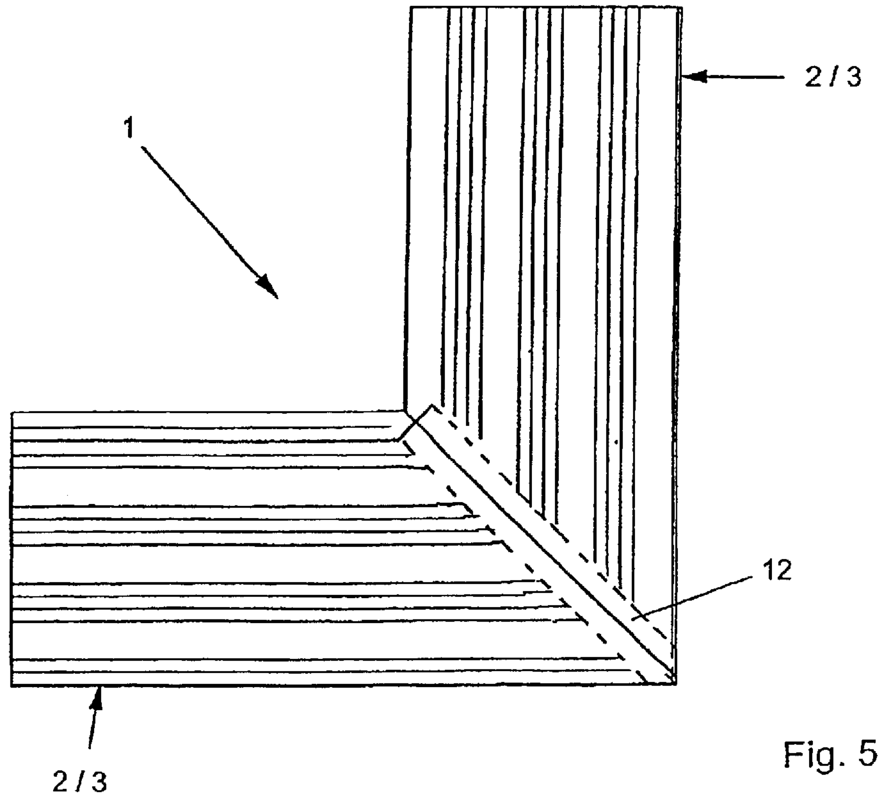
FIG. 5 shows diagrammatically a lengthwise section through a connection point of two window sections with at least one inserted connecting element.

Preferably, two dovetail connecting elements 12 are inserted side by side and at a distance apart in the frame section 3, and preferably three in the sash section 2. However, no limits are set to the invention here. It is also possible for a plurality of corresponding connecting elements 12, as indicated in particular in FIG. 5, to connect the corresponding window sections 1 to one another by their end surfaces, turned through 90° relative to the example of embodiment shown in FIG. 4.

What is claimed is:

1. A method for producing a window section comprising the steps of:

providing an elongated section;

profiling the elongated section with a glass rebate and at least one gear channel wherein a visible surface of the elongated section is formed between the glass rebate and the gear channel;

covering the visible surface with a covering layer wherein the covering layer is selected from the group consisting of wood veneer and foil;

bevel cutting the covered elongated section to produce individual window sections and surfaces;

milling dovetail grooves into the end surfaces of the individual window sections to produce a dovetail connection;

drilling receiving holes for dowel pins into an end surface of the bevel-cut individual window sections; and inserting connecting elements into the dovetail grooves and fixing dowel pins in the drilled holes in an end surface of the individual window sections.

2. A method as claimed in claim 1, wherein the covering layer is adhesively bonded to the section.

3. A method as claimed in claim 1, wherein the covering layer is varnished.

4. A method as claimed in claim 1, wherein the covering layer is provided with a protective film.

5. A method as claimed in claim 1, wherein the holes in the end surfaces are being oriented transversely relative to some of the individual window section.

6. A method as claimed in claim 1, wherein dovetail grooves are milled into an end surface of the elongated frame section.

7. A method according to claim 1, wherein a plurality of window sections are produced wherein at least one of the window sections is a sash section and a frame section.

8. A method according to claim 1, including profiling the elongated section with a plurality of connecting grooves.

9. A method as claimed in claim 7, wherein the sash and frame sections of the window sections are glued together by their end surfaces by means of connecting elements.

10. A method as claimed in claim 7, wherein the elongated section is cut to lengths to form a frame and a sash and at least two dovetail grooves are milled in an end surface of the frame and at least three dovetail grooves in an end surface of the sash.

* * * * *